United States Patent
Davis et al.

(10) Patent No.: US 7,567,902 B2
(45) Date of Patent: Jul. 28, 2009

(54) GENERATING SPEECH RECOGNITION GRAMMARS FROM A LARGE CORPUS OF DATA

(75) Inventors: Brent L. Davis, Deerfield Beach, FL (US); David E. Reich, Jupiter, FL (US)

(73) Assignee: Nuance Communications, Inc., Burlington, MA (US)

( * ) Notice: Subject to any disclaimer, the term of this patent is extended or adjusted under 35 U.S.C. 154(b) by 679 days.

(21) Appl. No.: 10/246,901

(22) Filed: Sep. 18, 2002

(65) Prior Publication Data

US 2004/0054530 A1    Mar. 18, 2004

(51) Int. Cl.
*G10L 15/04* (2006.01)
(52) U.S. Cl. ................ 704/251; 704/257
(58) Field of Classification Search .......... 704/1, 704/9, 255, 257
See application file for complete search history.

(56) References Cited

U.S. PATENT DOCUMENTS

| | | | |
|---|---|---|---|
| 5,146,405 A | 9/1992 | Church | 364/419 |
| 5,331,556 A | 7/1994 | Black, Jr. et al. | 364/419.08 |
| 5,610,812 A | 3/1997 | Schabes et al. | 395/759 |
| 5,721,902 A | 2/1998 | Schultz | 395/604 |
| 5,845,306 A | 12/1998 | Schabes et al. | 707/532 |
| 5,933,822 A | 8/1999 | Braden-Harder et al. | 707/5 |
| 5,937,385 A * | 8/1999 | Zadrozny et al. | 704/257 |
| 6,026,388 A | 2/2000 | Liddy et al. | 707/1 |
| 6,076,088 A * | 6/2000 | Paik et al. | 707/5 |
| 6,101,492 A | 8/2000 | Jacquemin et al. | 707/3 |
| 6,167,370 A | 12/2000 | Tsourikov et al. | 704/9 |
| 6,182,029 B1 | 1/2001 | Friedman | 704/9 |
| 6,202,064 B1 | 3/2001 | Julliard | 707/5 |
| 6,212,494 B1 | 4/2001 | Boguraev | 704/9 |
| 6,246,977 B1 | 6/2001 | Messerly et al. | 704/9 |
| 6,263,335 B1 * | 7/2001 | Paik et al. | 707/5 |
| 6,278,968 B1 * | 8/2001 | Franz et al. | 704/3 |
| 6,282,507 B1 * | 8/2001 | Horiguchi et al. | 704/3 |
| 6,289,304 B1 | 9/2001 | Grefenstette | 704/9 |
| 6,301,560 B1 * | 10/2001 | Masters | 704/251 |
| 6,330,537 B1 | 12/2001 | Davis et al. | 704/257 |
| 6,434,523 B1 * | 8/2002 | Monaco | 704/257 |
| 6,665,640 B1 * | 12/2003 | Bennett et al. | 704/257 |
| 6,952,666 B1 * | 10/2005 | Weise | 704/9 |
| 6,973,429 B2 * | 12/2005 | Smith | 704/257 |
| 2002/0010574 A1 | 1/2002 | Tsourikov et al. | 704/9 |
| 2002/0032564 A1 * | 3/2002 | Ehsani et al. | 704/235 |
| 2002/0042707 A1 * | 4/2002 | Zhao et al. | 704/9 |
| 2004/0044952 A1 * | 3/2004 | Jiang et al. | 715/500 |

FOREIGN PATENT DOCUMENTS

JP        8241314        9/1996

* cited by examiner

*Primary Examiner*—Angela A Armstrong
(74) *Attorney, Agent, or Firm*—Wolf, Greenfield & Sacks, P.C.

(57) ABSTRACT

A method of generating a speech recognition grammar for use with a speech recognition system can include parsing the corpus of data to identify grammatical structures within the corpus of data. The identified grammatical structures can be compared with grammar generation rules to determine particular ones of the identified grammatical structures to include within the speech recognition grammar. The grammar generation rules can designate which grammatical structures are to be included within the speech recognition grammar. The grammatical structures which have been identified in the parsing step and which also have been designated by the grammar generation rules can be included in the speech recognition grammar.

4 Claims, 1 Drawing Sheet

GENERATING SPEECH RECOGNITION GRAMMARS FROM A LARGE CORPUS OF DATA

BACKGROUND

1. Technical Field

The present invention relates to the field of speech recognition and, more particularly, to the generation of a grammar for use with a speech recognition system.

2. Description of the Related Art

Conventional data processing systems frequently incorporate speech-based user interfaces to provide users with speech access to a corpus of data stored and managed by a data processing system. To adequately process user requests or queries, however, a speech recognition system must have the ability to recognize particular words which are specified within the corpus of data, and therefore, words which likely will be received as part of a user request. Thus, the speech recognition system must include a speech recognition grammar which lists relevant, if not all, terms included within the corpus of data.

From a speech recognition perspective, simply including all possible words of a corpus of data within a speech recognition grammar can lead to an extremely large and inefficient grammar. An oversized speech recognition grammar can lead to ambiguities when converting speech to text, and therefore, decreased speech recognition accuracy. An oversized grammar further can result in increased search times when recognizing user spoken utterances. In consequence, efforts have been made to reduce the size of speech recognition grammars while still ensuring that relevant and adequate vocabulary is specified for searching a large corpus of data.

One solution used to generate speech recognition grammars from a corpus of data has been to identify keywords from the corpus of data and include those keywords within the speech recognition grammar. Because only those words considered to be keywords are included within the grammar, the size of the grammar can be limited, at least when compared to the size of the entire corpus of data. The keywords typically are derived or identified from an empirical analysis of the corpus of data to identify important words or from a statistical analysis of the corpus of data to identify words having a minimum frequency of appearance. The keyword method seeks to ensure that the most relevant or important terms of a corpus of data are included within the grammar.

Using keyword or other related word spotting techniques for generating speech recognition grammars does have disadvantages. One such disadvantage is that the speech recognition grammars generated using keyword techniques are domain specific. Accordingly, for each identifiable domain of a data corpus, or for each distinct corpus of data, keywords first must be identified as previously discussed. Keyword identification in and of itself can be both time and resource intensive and must be entirely duplicated for each different domain being processed. That is, the generation of a speech recognition grammar for one particular domain provides no benefit or advantage when developing a speech recognition grammar for a different domain. The process, including keyword identification, must be started anew for each domain.

Another disadvantage of using keyword techniques for generating speech recognition grammars is that the grammars must be updated continually as the corpus of data changes and as the underlying subject matter evolves. As new sources of information are added to a corpus of data, so too must new keywords be identified from the sources so that important terminology can be included within the speech recognition grammar. In consequence, the maintenance of keyword style grammar can be costly and time consuming. The disadvantages of maintaining such a grammar are exacerbated in the case where a set of domain specific speech recognition grammars are to be maintained as each grammar must be maintained independently of the others.

SUMMARY OF THE INVENTION

The present invention provides a solution for generating speech recognition grammars from data sets of well formed sentences, or those sentences which are constructed according to accepted grammatical syntax or linguistic norms. The present invention provides a generalized technique for determining speech recognition grammars from a large corpus of data without regard to the particular subject matter or domain of the corpus of data. In consequence, efficient speech recognition grammars can be generated from any of a variety of corpora of data, each pertaining to a different domain or subject, without the need for statistical analysis of text or an empirical analysis of text to identify keywords which are relevant to each different domain. Notably, as new data items or references are added to an existing corpus of data, the new data items also can be processed to identify additional words for inclusion within the speech recognition grammar without undertaking further statistical analysis or an empirical review of the new data items or the corpus of data as a whole. Accordingly, the present invention also provides for the automated generation of speech recognition grammars from a large corpus of data.

One aspect of the present invention can include a method of generating a speech recognition grammar for use with a speech recognition system or engine. The method can include parsing the corpus of data to identify grammatical structures within the corpus of data. The identified grammatical structures can be compared with grammar generation rules to determine particular ones of the identified grammatical structures to include within the speech recognition grammar. The grammar generation rules can designate particular ones of the grammatical structures to be included within the speech recognition grammar. The grammatical structures which have been identified in the parsing step and which also have been designated by the grammar generation rules are included in the speech recognition grammar.

According to another embodiment of the present invention, the grammatical part of speech of individual words can be identified during the parsing step. In that case, the grammar generation rules can designate particular grammatical parts of speech to be included within the speech recognition grammar. Thus, during the including step, the grammatical parts of speech which have been identified in the parsing step and which also have been designated by the grammar generation rules are included within the speech recognition grammar.

The resulting speech recognition grammar can be used with a speech recognition system for converting received user speech to text. For example, a spoken query for searching the corpus of data can be received. The speech query can be recognized or converted to text. Notably, at least those portions of the speech query which have been specified within the speech recognition grammar can be speech recognized. The corpus of data can be searched for the recognized portion of the spoken query.

Another aspect of the present invention can include a system for generating a speech recognition grammar. The system can include a parser configured to identify grammatical structures within a corpus of data having one or more well formed sentences and a set of grammar generation rules designating particular grammatical structures to be included within a speech recognition grammar. The system also can include a grammar processor configured to generate a speech recognition grammar by including within the speech recognition grammar grammatical structures included within the corpus of data and which also are designated by the grammar generation rules.

According to another embodiment of the present invention, the parser can be configured to identify individual words within the corpus of data as grammatical parts of speech. Similarly, the set of grammar generation rules can designate particular parts of speech to be included within a speech recognition grammar. Accordingly, the grammar processor can be configured to generate the speech recognition grammar by including within the speech recognition grammar grammatical parts of speech included within the corpus of data which also are designated by the grammar generation rules.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

The invention disclosed herein provides a method, apparatus, and system which can be used to generate speech recognition grammars for any of a variety of different subjects or domains. The present invention can derive a speech recognition grammar from a corpus of data used by an information processing system. A set of grammar generation rules, which can be programmatically altered, can be used to control the grammar generation process, and therefore, the degree of customization and focus of the resulting grammar. More particularly, by varying the grammar generation rules, the resulting speech recognition grammar can be given a broad or narrow focus when compared with the scope of the underlying corpus of data from which the speech recognition grammar was derived. Accordingly, rather than manually adding and/or deleting vocabulary words, the present invention provides an automated technique for generating and regenerating speech recognition grammars which can be applied to any of a variety of domains.

Figure 1:
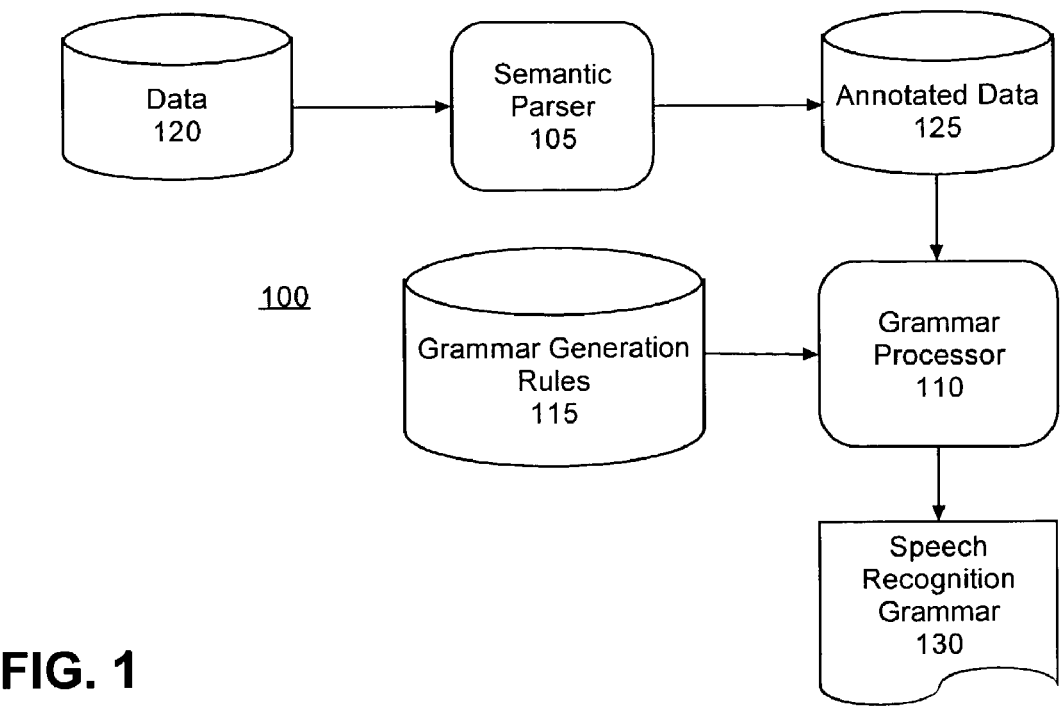
FIG. 1 is a schematic diagram illustrating a system for generating speech recognition grammars in accordance with the inventive arrangements disclosed herein.

FIG. 1 is a schematic diagram illustrating a system 100 for generating speech recognition grammars in accordance with the inventive arrangements disclosed herein. As shown, the system 100 can include a parser 105, a grammar processor 110, and a set of grammar generation rules 115. The system 100 can receive a corpus of data 120. The corpus of data can include any of a variety of data sources such as news headlines, articles, books, financial information, or any other source of information which includes well formed sentences. The corpus of data 120 can be arranged as a database, a collection of items, or any other searchable collection or compilation of data.

The parser 105 can be configured to identify various grammatical structures of the corpus of data 120. The parser 105 can be implemented, for instance, as a semantic parser. For example, the parser can identify subjects, predicates, noun phrases, verb phrases, prepositional phrases, and the like within the corpus of data 120. The parser 105 further can identify individual parts of speech within the corpus of data 120 such as nouns, verbs, prepositions, adjectives, conjunctions, adverbs, objects, and so on. The parser 105 can generate an annotated version 125 of the corpus of data 120 wherein each of the identified grammatical structures and/or parts of speech is labeled or tagged.

The annotated corpus of data 125 can be provided to the grammar processor 110. The grammar processor 110 can be configured to build a speech recognition grammar 130 from the annotated corpus of data 125 by including within the speech recognition grammar 130 only those grammatical structures and/or parts of speech which have been designated for inclusion within the speech recognition grammar 130 by the grammar generation rules 115.

The grammar generation rules 115 can be configured by a developer to specify which grammatical structures and/or parts of speech are to be included within the speech recognition grammar 130 being generated. For example, the grammar generation rules 115 can specify that only nouns, proper nouns, and verbs are to be included within the speech recognition grammar 130, while conjunctions, adjectives, and adverbs are to be excluded. The same principles can be applied to grammatical structures. For example, while subjects of sentences can be included within the speech recognition grammar, prepositional phrases can be excluded.

Still, the grammar generation rules 115 can specify any combination or permutation of identifiable parts of speech and/or grammatical structures to be included within, and in consequence, those which are to be excluded from the speech recognition grammar 130. For example, the grammar generation rules can specify that while grammatical structures such as subjects are to be included within the speech recognition grammar 130, only objects of prepositional phrases rather than entire prepositional phrases are to be included within the speech recognition grammar 130. The grammar generation rules 115 can be specified using any of a variety of conventional techniques. Taking another example, the grammar generation rules 115 can specify proximity ranges wherein, for instance, only verbs within 1 (one) word, a sentence, or a paragraph of an identified noun are to be included within the speech recognition grammar 130.

Thus, the grammar processor 110 can access the grammar generation rules 115 to process the annotated corpus of data 125. The resulting speech recognition grammar 130 can be generated and output from the grammar processor 110 for use with a speech recognition engine. Notably, the resulting grammar includes only words which were initially included within the corpus of data 120. By varying which parts of speech and/or grammatical structures are to be included within the speech recognition grammar 130, a developer can adjust the focus of the speech recognition grammar from a more narrow focus, or one that specifies fewer words such as nouns and verbs, to a broader focus, for example one that includes adjectives, adverbs, prepositions, conjunctions, or entire phrases.

Figure 2:
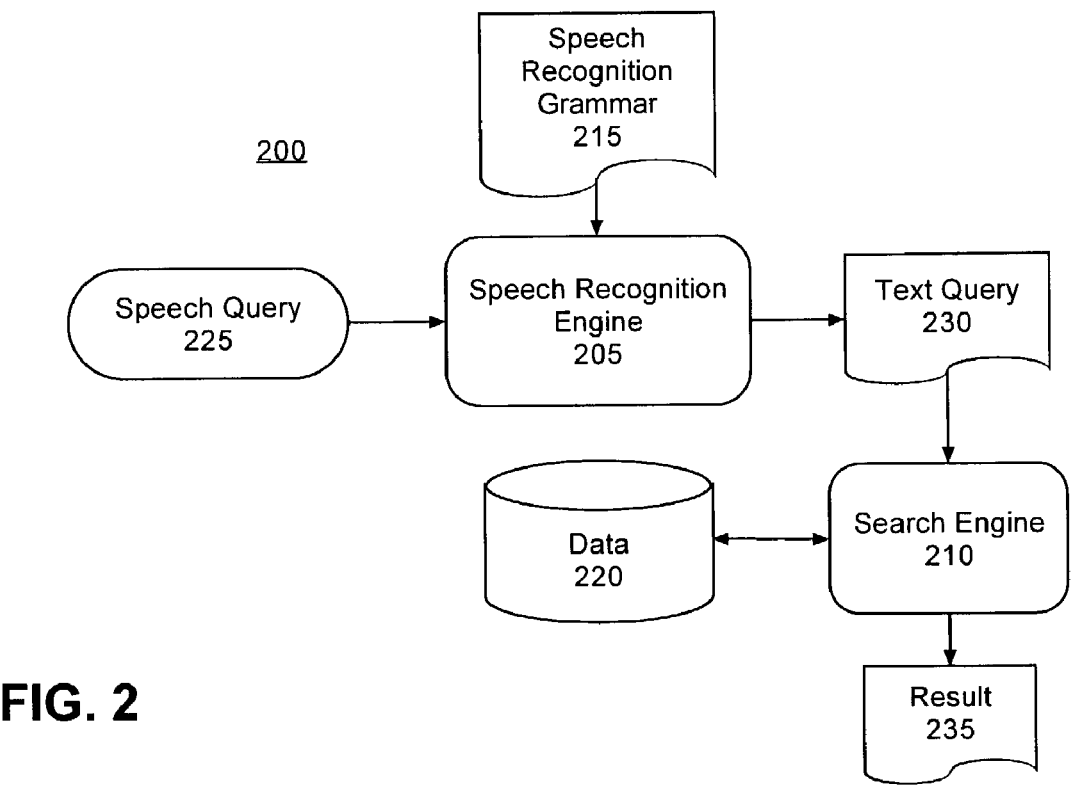
FIG. 2 is a schematic diagram illustrating a system which incorporates the speech recognition grammar generated using the system of FIG. 1.

FIG. 2 is a schematic diagram illustrating a system 200 which incorporates a speech recognition grammar generated using the system of FIG. 1. As shown in FIG. 2, the system 200 includes a speech recognition engine 205 and a search engine 210. The speech recognition engine 205 can be configured to include a speech recognition grammar 215 which can be generated as discussed with reference to FIG. 1. The speech recognition engine 205, as is known in the art, can receive a speech input and convert the speech input to a textual representation.

The search engine 210 can be included within a larger data processing system, for example one that is configured to manage, read, and write data to the data store 220. The data store 220, similar to the data store 120 of FIG. 1, can include any of a variety of searchable data specified as one or more well formed sentences. Accordingly, the search engine 210 can be configured to search the data store 220 as specified by received user queries.

In operation, a user speech request or query 225 can be received by the speech recognition engine 205. The speech recognition engine 205 can function as a speech interface to the data processing system and search engine 210. Accordingly, the received speech request 225 can be converted to a textual representation 230. Notably, as the speech recognition engine 205 uses the grammar 215 to convert speech to text, only those words and/or phrases of the received speech request 225 which are specified within the speech recognition grammar 215 are converted to text. Accordingly, the speech recognition engine 205, as a matter of standard operation, filters the received speech query 225 to only those words and/or phrases that are included or specified within the data store 220.

The textual representation 230 then can be provided to the search engine 210. The search engine 210 can interpret the received textual representation 230 of the received speech query 225. Accordingly, the search engine 210 can formulate a query to search the data store 220 to determine results 235. The results can be processed further as necessary. For example, the text result can be provided to a text-to-speech engine for playback to a user.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of generating an expandable speech recognition grammar for use with a speech recognition engine comprising:

parsing a corpus of data using a processor to generate an annotated corpus of data identifying grammatical structures and grammatical parts of speech within the corpus of data, wherein the corpus of data comprises a plurality of well formed sentences, and wherein the parsing comprises providing for each identified grammatical structure and grammatical part of speech a tag labeling each identified grammatical structure and grammatical part of speech accordingly;

using the processor to compare the identified grammatical structures and the identified grammatical parts of speech within the annotated corpus of data with grammar generation rules to designate particular ones of the identified grammatical structures and the identified grammatical parts of speech to include within a speech recognition grammar to be generated, wherein the grammar generation rules further designate, independently of a context of the corpus of data and any words already included in the expandable speech grammar, particular grammatical parts of speech and grammatical structures to be included within the expandable speech recognition grammar to be generated; and using the processor to include within the expandable speech recognition grammar one or more words associated with the grammatical structures within the annotated corpus of data which have been identified in said parsing step and designated in said comparing step by the grammar generation rules, exclusive of words already included in the expandable speech recognition grammar, wherein the grammar is generated without use of counter-examples associated with the corpus of data.

2. The method of claim 1, further comprising adapting the processor for:

receiving a spoken query to search the corpus of data;
   speech recognizing a portion of the spoken query which is specified in the expandable speech recognition grammar; and
   searching the corpus of data for the recognized portion of the spoken query.

3. The method of claim 1, further comprising adapting the processor for:

identifying an additional corpus of data necessary for expansion of the expandable speech recognition grammar, wherein the additional corpus of data comprises one or more well formed sentences;
   parsing the additional corpus of data to generate an annotated additional corpus of data identifying grammatical structures within the additional corpus of data;
   comparing the identified grammatical structures within the annotated additional corpus of data with the grammar generation rules to designate particular ones of the identified grammatical structures within the annotated additional corpus of data to include within the expandable speech recognition grammar, wherein the grammar generation rules designate, independently of the context of the corpus of data and any words already included in the expandable speech grammar, which grammatical structures within the annotated additional corpus of data are to be included within the expandable speech recognition grammar; and
   including one or more words associated with the grammatical structures within the annotated additional corpus of data within the expandable speech recognition grammar which have been identified during said parsing of the additional corpus of data and which also are designated by the grammar generation rules, exclusive of words already included in the expandable speech recognition grammar.

4. The method of claim 1, further comprising adapting the processor to generate the grammar based on a proximity of words in one of the well formed sentences of the corpus of data independent of the content of the one well formed sentence.

* * * * *